March 6, 1973   T. C. JOHNSON   3,719,373
CASTERED TRAILER FOR A VEHICLE
Filed June 21, 1971   3 Sheets-Sheet 1
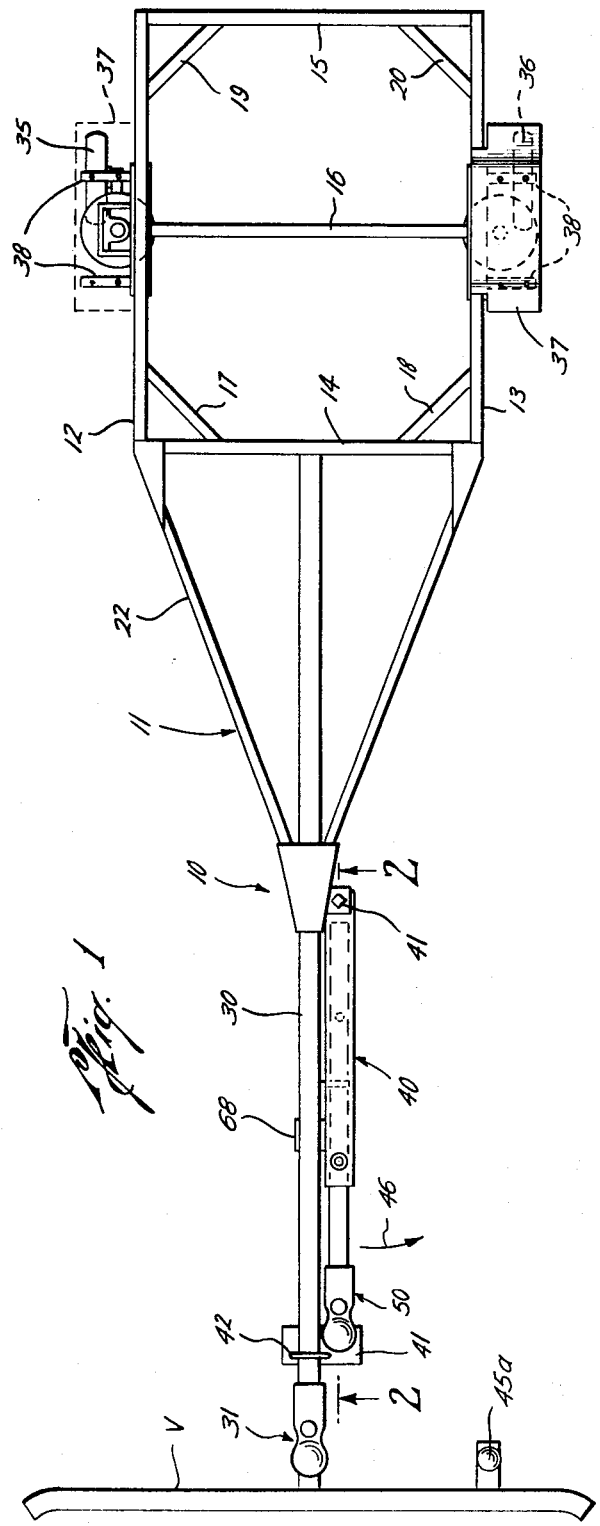
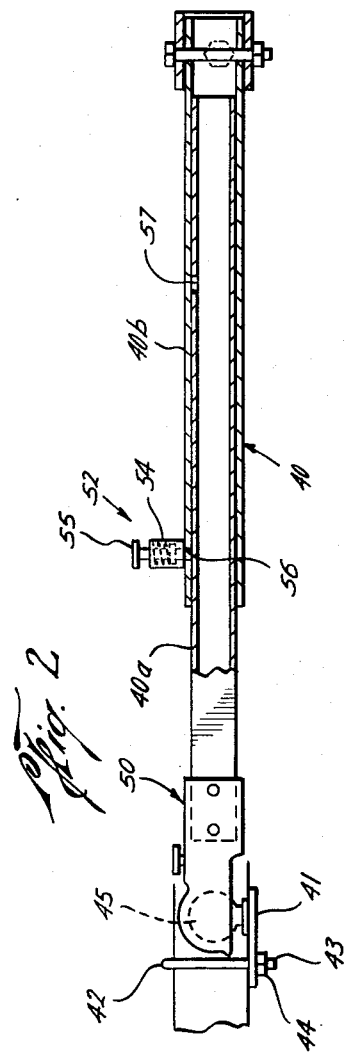
Thomas C. Johnson
INVENTOR
BY   Jack W. Hayden
ATTORNEY

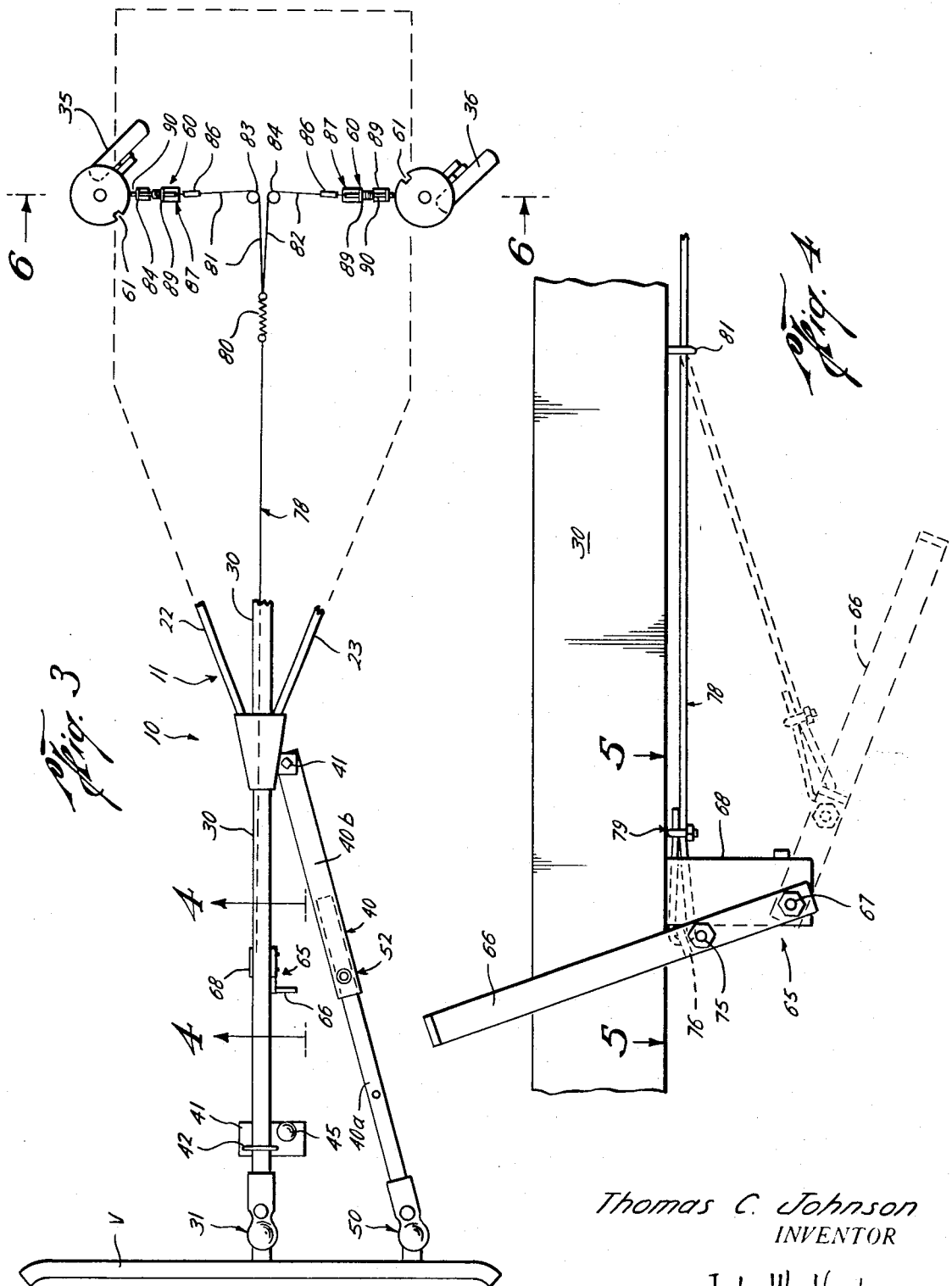

March 6, 1973     T. C. JOHNSON     3,719,373
CASTERED TRAILER FOR A VEHICLE
Filed June 21, 1971     3 Sheets-Sheet 3
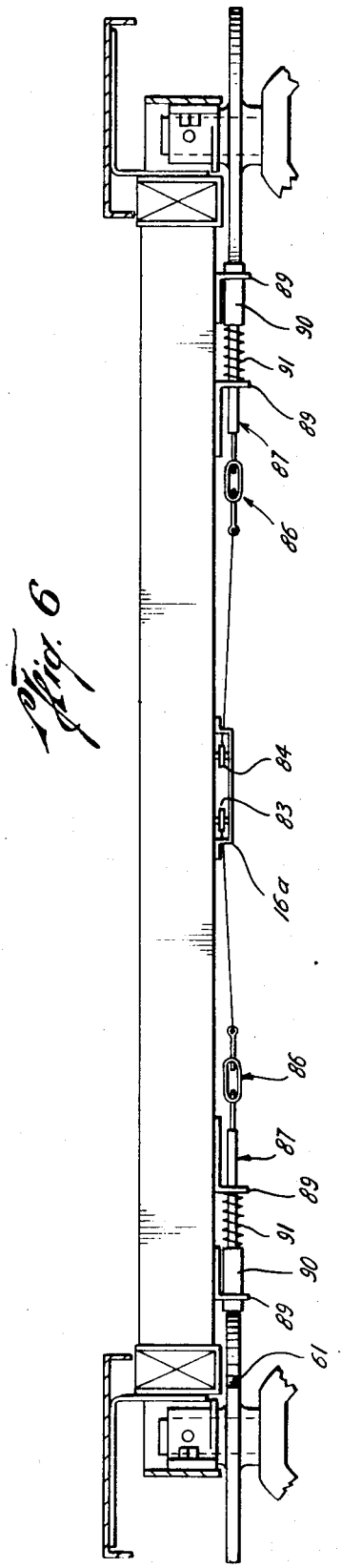
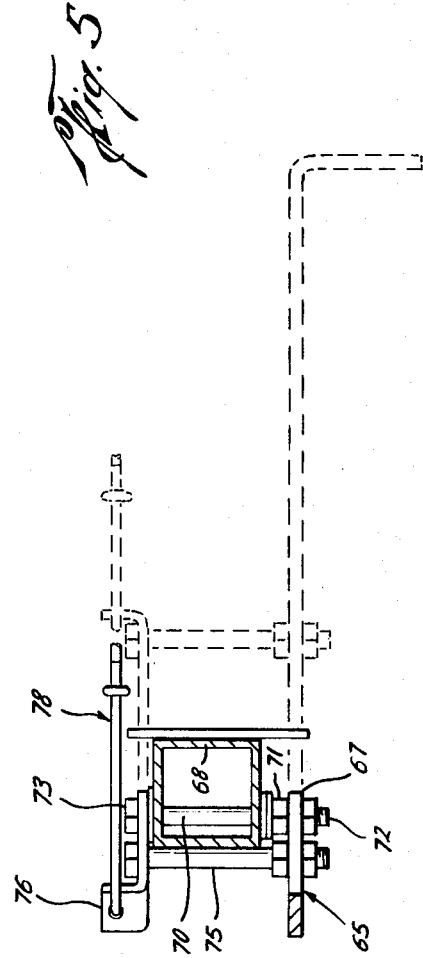
Thomas C. Johnson
INVENTOR
BY   Jack W. Hayden
ATTORNEYS United States Patent Office 3,719,373
Patented Mar. 6, 1973

3,719,373
CASTERED TRAILER FOR A VEHICLE
Thomas C. Johnson, Houston, Tex., assignor to
Easy-Back, Inc., Shreveport, La.
Filed June 21, 1971, Ser. No. 154,779
Int. Cl. B62d 53/00
U.S. Cl. 280—474                                15 Claims

ABSTRACT OF THE DISCLOSURE

A trailer for a vehicles includes a frame supported by casters with cooperating latch and detent means on the trailer and casters, respectively, to normally lock the casters against swiveling movement. Tongue means is connected with the frame and includes pivot means for securing the trailer to a vehicle, a control bar is pivotally mounted on the trailer adjacent the tongue for easy access and includes pivot means for securing the control bar to the vehicle at a point offset from the connection of the tongue to the vehicle when the control bar is pivoted away from the tongue to a second position to form a rigid structure between the vehicle and trailer. Actuating means to actuate the latch and detent means to release the casters are mounted on the tongue and frame of the trailer for easy access after the control bar has been secured to the vehicle to form a rigid structure for swiveling.

BACKGROUND OF THE INVENTION (1) Field of the invention

The present invention relates to castered trailers and to an arrangement for forming a rigid connection between the castered trailer and the vehicle with which it is connected so that the trailer may be aligned with the vehicle for rearward movement. Means are provided for locking the casters of the trailer against swiveling and to release them for swiveling when desired.

(2) Description of the prior art

Various patents have been issued relating to trailers employing casters, such as the patent to D. R. Boone, No. 2,475,174; C. F. Forbes, No. 2,537,521; A. Zaha, No. 2,-949,317; A. Zaha, No. 3,033,593; and W. M. Breithaupt, No. 3,322,440, and there may be others with which applicant is not familiar. All of the foregoing references employ structures which may be disadvantageous for one of several reasons. For example, none of the above references disclose a castered trailer with a tongue for pivotally connecting to a vehicle and a control bar which is supported adjacent the tongue for easy access without interfering with the load on the trailer so that the control bar can be connected to the vehicle to form a rigid structure between the vehicle and the trailer and an actuating means for releasing the casters of the trailer for swiveling, wherein the actuating means is also positioned for easy access away from the trailer and its load.

In Breithaupt, the control bar is mounted on the trailer, thus making it difficult for access with a load on the trailer in order that it may be connected to the vehicle. Furthermore, in Breithaupt, when the control rod or bar is moved, it automatically releases the casters for swiveling. This could be extremely dangerous, such as where the vehicle and trailer are on an incline so that when the control bar is moved, relative movement of the trailer to the vehicle may occur by release of the casters for swiveling. Any movement of the trailer relative to the vehicle in Breithaupt would then necessitate a repositioning of the vehicle in a predetermined relationship to the trailer since the control bar 90 is of a fixed length and requires a predetermined relationship between the vehicle and the trailer before it can be secured, so that any premature movement of the trailer by release of the casters for swiveling would actually prevent the control bar from being connected to the vehicle until the vehicle had been properly repositioned relative to the trailer.

In Zaha, No. 3,033,593, the release of the casters is immediately adjacent the wheels requiring access thereto either underneath or near the load on the trailer which may be undesirable. Similarly, the means for locking the rods to form a rigid structure between the vehicle and trailer is adjacent the trailer and may possibly be underneath any load thereon which is also objectionable. Zaha, No. 3,033,-593, apparently contemplates that the struts always be connected between the vehicle and the trailer, and the locking means to lock the struts is only actuated when the vehicle is backed. This structure may be cumbersome and expensive, and in some situations completely undesirable.

SUMMARY OF THE INVENTION

The present invention relates to a trailer construction employing a frame which is supported by casters that are normally locked against swiveling. A tongue is connected to the trailer and is provided with pivot means so that the trailer may be pivotally connected to a vehicle. A control bar means is supported alongside the tongue for easy access so that it may be pivoted away from the tongue and connected to the vehicle in an offset relationship relative to the pivot point of the trailer tongue and vehicle to form a rigid structure between the vehicle and the trailer. The cooperating latch and detent means on the trailer and casters, respectively, which normally retain the casters against the swiveling is connected with actuating means that are mounted in a position away from the load carried on the trailer and is normally urged to position to retain the casters against swiveling, but access may be easily had to the actuating means for release of a cooperating latch and detent means to enable swiveling of the trailer wheels when desired. The cooperating latch and detent means and the actuating means therefor is constructed and arranged so that when the actuating means has disengaged the latch means and detent means, they are restrained from re-engagement until the actuating means is moved to a position to enable them to be engaged.

An object of the present invention is to provide in a trailer with caster wheels and having a tongue with a pivot means for pivotally connecting the trailer to a vehicle, a control bar supported adjacent the tongue with pivot means thereon so that the control bar may be first moved away from the tongue and engaged with the vehicle to form a rigid structure between the vehicle and trailer before the casters are released for swiveling movement.

Another object of the present invention is to provide in a trailer with caster wheels and having a tongue with a pivot means for pivotally connecting the trailer to a vehicle, a control bar supported adjacent the tongue with pivot means thereon so that the control bar may be first moved away from the tongue and engaged with the vehicle to form a rigid structure between the vehicle and trailer before the casters are released for swiveling movement and actuating means mounted on the tongue and operatively connected for releasing the casters for swiveling.

Still another object of the present invention is to provide in a trailer with casters including cooperating latch and detent means on the trailer and casters to lock the casters normally against swiveling movement, and a tongue with a pivot means so that the trailer may be pivotally connected to a vehicle, a control bar pivotally supported adjacent the tongue for easy access thereto so that the control bar may be connected to the vehicle to form a rigid structure and actuating means mounted on the tongue including a crank which is connected with a cable with a spring on one end thereof, and a pair of cables extending around pulleys on the trailer with spring loaded latch means connected to one end of each of the cables for engaging in detents in the casters so that the casters are normally restrained against swiveling, such actuating means constructed and arranged to remove the latch means from the detents to enable the casters to swivel and to restrain re-engagement of the latch with the detent.

Yet a further object of the present invention is to provide in a trailer with casters having a tongue with a pivot means thereon for securing the trailer to a vehicle, a control bar supported adjacent the tongue and formed of extensible sections with pivot means on one of the sections so that the control bar may be moved away from the tongue and extended for connection with the vehicle to provide a rigid structure between the vehicle and the trailer, there being means to lock the extended sections of the control bar, and the arrangement of the control bar being such that access may be had thereto without disturbing the load on the trailer.

Yet still another object of the present invention is to provide in a trailer with casters having a tongue with a pivot means thereon for securing the trailer to a vehicle, a control bar supported adjacent the tongue and formed of extensible sections with pivot means on one of the sections so that the control bar may be moved away from the tongue and extended for connection with the vehicle to provide a rigid structure between the vehicle and the trailer, there being means to lock the extended sections of the control bar, the arrangement of the control bar being such that access may be had thereto without disturbing the load on the trailer, and an actuating means for release of the casters for swiveling, such actuating means being mounted on the tongue so that access may be had thereto without disturbing the load on the trailer.

Yet a further object of the present invention is to provide a trailer with castered wheels which are normally restrained against swiveling, a tongue connected with the trailer for pivotally connecting the trailer to the vehicle, a control bar supported adjacent the tongue for easy access thereto so that it may be pivotally moved away from the tongue and connected to the vehicle to form a rigid structure, and latch means mounted on the tongue and operative only after the control bar has been moved to connect with the vehicle to then release the casters for swiveling.

Other objects and advantages of the present invention will become more readily apparent from a consideration of the following description and drawings.

BRIEF DESCRIPTION OF THE DRAWINGS

FIG. 1 is an elevation of the present invention illustrating the preferred relationship of the control bar to the trailer tongue when the control bar is not in use;

FIG. 2 is a sectional view on the line 2—2 of FIG. 1 illustrating the telescoping relationship of the sections of the control bar and means for locking them when they are in extended relationship;

FIG. 3 is a plan view similar to FIG. 1 showing the control bar pivoted away from the tongue and secured to the vehicle to form a rigid structure, and the actuating means actuated to release the spring loaded latch means on the trailer from their respective detents in the casters;

FIG. 4 is a side view on the line 4—4 of FIG. 3 illustrating in dotted line the original position of the actuating means and in full line the position of the actuating means after the control bar has been moved out of the way and the crank of the actuating means moved to a position to restrain the spring loaded latch means from moving into engagement with the detents in the casters;

FIG. 5 is a sectional view on the line 5—5 of FIG. 4 showing further details of the actuating means; and FIG. 6 is a sectional view on the line 6—6 of FIG. 3 and shows in greater detail the casters which are pivotally mounted on the trailer and the pulleys on the trailer for carrying the cable means to which is connected the spring loaded latch means that engages in the detents in the casters to restrain pivoting movement.

DESCRIPTION OF THE PREFERRED EMBODIMENT

Reference is first directed to FIG. 1 of the drawings wherein the trailer of the present invention is referred to generally by the numeral 10. It includes a frame referred to generally at 11, which frame may be of any suitable construction for the purposes to which it is to be employed. For purposes of illustration only, the frame 11 as shown in FIG. 1 of the drawings includes the spaced side members 12 and 13 connected by the braces 14 and 15 and the intermediate brace 16. Additional bracing such as shown at 17, 18, 19, and 20 may be employed if desired. The forward end of the trailer 10 comprises the converging members 22 and 23 that are rigidly connected adjacent the front of the rectangular portion of the frame 11 represented by members 12, 13, 14, and 15 and are connected at their other end to the tongue 30 which is shown as extending forwardly from the cross bar 14 a suitable distance.

The tongue 30 is provided at its forward end with suitable pivot means represented at 31 which may comprise a standard trailer hitch so that the trailer 10 may be connected to the ball of the hitch on vehicle V.

The frame 11 of the trailer 10 is supported by the casters 35 and 36 over which suitable fenders as illustrated at 37 may be carried on the frame 11 by the members 38 extending laterally from the side bars 12 and 13. The casters 35 and 36 are mounted on the trailer for swiveling, and suitable means to lock them against swiveling are provided which will be described hereinafter. Also, means are provided for releasing the lock means to enable the wheels or casters 35 and 36 to swivel when desired.

A control bar means referred to at 40 is pivotally mounted at 41 and extends longitudinally adjacent the tongue 30 and is supported adjacent the tongue 30 in any suitable manner such as by the plate 41 carried by the clamp 42 that fits over the tongue 30 and extends through the plate 41 as better illustrated in FIG. 2 of the drawings. The ends 43 of the clamp 42 are threaded for receiving the nuts 44 to clamp the plate 41 in position on the tongue. The control bar means 40 may be mounted on either side of the tongue 30, but it is to be noted that it is supported in position in relation to the frame 11 of the trailer 10 so that easy access may be had to the control bar means for moving it outwardly as represented by the arrow at 46 and connecting it to the vehicle V at a point offset from the connection of the tongue 30 to the vehicle to form a rigid structure between the vehicle and the trailer. The position of the control bar means 40 as illustrated in FIG. 1 may be referred to as one, or the first position, and its position as illustrated in FIG. 3 of the drawings may be designated its second position.

The control bar means 40 also includes pivot means 50 which may be in the form of a trailer hitch which is normally supported on the ball 45 carried on the plate 41 as shown in FIG. 2 and FIG. 3 of the drawings. Thus, the control bar means 30 may be locked in its first position by engaging the pivot means 50 with the ball 45. The control bar means 40 is formed of a plurality of telescoped sections 40a and 40b which are in telescoped relation when the control bar 40 is in its first position as illustrated in FIG. 1 of the drawings adjacent the tongue 30.

When it is desired to engage the control bar 40 in its second position as illustrated in FIG. 3 of the drawings, it is disengaged from the ball 45 and swung outwardly in the directions as noted by the arrow 46 and the sections 40a and 40b extended relative to each other until the pivot means 50 engages with the ball 45a on the vehicle V as illustrated in FIGS. 2 and 3 of the drawings. When this occurs, the lock means referred to generally by the numeral 52 engages the sections 40a and 40b in such extended relationship. The lock means 52 includes the housing 54 with a spring loaded plunger 55 received therein. The spring loaded plunger 55 is urged downwardly through the hole 56 in the section 40b and when the sections 40a and 40b are extended so that the control bar means 40 may be engaged with the vehicle V as shown in FIG. 3 of the drawings (i.e., when the vehicle is aligned with the trailer), the spring loaded plunger 55 will thereupon automatically move into the hole 57 on section 40a. When it is desired to disconnect the control bar 40, it is disengaged from the ball 45a and the spring loaded plunger 55 may be limted upwardly to disengage it from the opening 57 to enable the section 40a to be telescoped within the section 40b of the control bar means 40.

It is to be noted that the control bar 40, as previously noted, is mounted in relationship to the frame 11 so that the movement thereof away from the tongue 30 to engage with the vehicle V may be readily accomplished without moving underneath the load on the vehicle.

Latch means represented generally at 60 in FIG. 3 are carried by the frame 11 of the trailer 10 for engaging with the detent 61 of the casters 35 and 36 to normally lock them against swiveling and in the position as represented in FIG. 1 of the drawings. Suitable means represented generally by the numeral 65 in FIG. 4 are operatively connected to actuate the latch means 60 and detents 61 for release therebetween whereby the casters 35 and 36 may swivel as represented in FIGS. 3 and 6 of the drawings. The actuating means 65 is mounted relative to the frame 11 of the trailer 10 so that access may be readily had thereto without disturbing the load on the trailer. Also, the actuating means is arranged so that it, preferably, cannot be actuated until the control bar means 40 has been moved to the position shown in FIG. 3 to lock the vehicle V and trailer 10 in a predetermined relationship by the rigid structure formed by the tongue 30 and the control bar 40 and their connection with the vehicle V, as previously described.

The actuating means 65 includes the crank 66 which is pivotally connected at 67 to the support 68 which is mounted on the nether side of the tongue 30 as shown in FIGS. 3 and 4 of the drawings. The support 68 may be of any suitable configuration, and as shown in FIG.5 of the drawings, it is rectangular, and a pin 70 extends through the sides of the support 68 as shown in FIG. 5 to provide the pivot 67 for the end of the crank 66 on support 68. The pin 70 may be mounted in position in support 68 by any suitable means such as the nut 71 secured to the threaded end 72 thereof. The other end of the pin 70 is provided with a head 73. The member 75 is connected to the crank 66 as shown in FIGS. 4 and 5 of the drawings in spaced relation to the pivot 67 and is also connected to the arm 76 mounted on pivot 67. The cable means referred to generally at 78 is connected to arm 76 by any suitable means such as the clamp arrangement represented at 79. The cable means extends longitudinally of the tongue 30 and if desired, suitable supports such as the loops 81 may be secured to the tongue 30 for supporting the cable means 78. Spring means 80 is connected at one of its ends to the end of the cable means 78 and at the other end of the spring 80, cables 81 and 82 are connected which extend around the pulleys 83 and 84, which pulleys are mounted in any suitable manner on the frame 11 of the trailer 10. The pulleys 83 and 84 may be connected by one end of their shafts to the frame 11 and the other end of the shaft upon which they rotate is carried in a suitable housing 16a to permit free rotation of the pulleys 83 and 84.

The cables 81 and 82 extend around the pulleys 83 and 84 and are connected at their respective ends to a turnbuckle represented generally by the numeral 86, which turnbuckles in turn are connected to their respective plunger means 87. The plunger means 87 are each carried in the brackets 89 also mounted on the frame 11 in alignment with the pulleys 83 and 84. The plunger means 87 are enlarged at their forward end as represented at 90 with the end of the enlargement 90 having a suitable configuration for engaging with the detents 61. Suitable spring means 91 between the enlargement 90 and the adjacent bracket 89 tend to urge each of the enlargements 90 of plunger means 87 towards engagement in one of the detents 61.

After the control bar means 40 has been moved to the position shown in FIG. 3, it will be noted that access may be had to the cranks 60, the arm of which extends in the same direction as the control bar means 40 so that when the control bar means 40 is in its first position as shown in FIG. 1, movement of the crank 66 is prevented, thus avoiding premature release of the actuating means and premature swiveling of the casters 35 and 36 before the control bar means 40 has been properly positioned on the vehicle V to form a rigid structure. After the control bar means 40 is positioned as shown in FIG. 3, the crank arm 66 may then be moved in a clockwise direction as viewed in FIG. 4 to the position shown in FIG. 4 whereupon a force is exerted upon the cable means 78, spring 80, cables 81 and 82, and the springs 91 so as to move the enlargements 90 out of the detents 61 of the casters 35 and 36, permitting them to swivel.

The turnbuckle arrangement represented generally at 86 enables the proper tension to be maintained in the cable means 78, spring 80, cables 81 and 82, and the springs 91, to engage the enlargements 90 in detents 61 and to enable the means 65 to retain them disengaged when crank 66 has been moved to the position of FIG. 4.

It will be noted that the actuating means 65 is constructed and arranged so that when the crank 66 is moved from the dotted line position shown in FIG. 4 to the full line position, it will be moved relative to the pivot point 67 so that the cable means 78 and the rest of the actuating means is locked so as to restrain re-engagement of the enlargement 90 with its respective detent 61. The tension in springs 80 and 91 is maintained by adjustment 86 such that this result may be accomplished.

From the foregoing description, it can be appreciated that the present invention provides a castered trailer wherein the casters are normally locked against swiveling, but which includes a control bar which may be moved from a first position adjacent the tongue to a second position away from the tongue and in spaced relation to the connection of the tongue with the vehicle so that the control bar may be connected to the vehicle to form a rigid relationship. The control bar is constructed and arranged so that access may be had thereto and connection thereof with the vehicle may be effected without disturbing the load on the trailer 10.

Thereafter, the actuating means may be actuated to release the cooperating latch and detent means for swiveling of the casters 35 and 36 in any desired manner.

The foregoing disclosure and description of the invention are illustrative and explanatory thereof, and various changes in the size, shape, and materials as well as in the details of the illustrated construction may be made without departing from the spirit of the invention.

What is claimed is:

1. A trailer for a vehicle including:
   (a) a frame;
   (b) casters supporting said frame;
   (c) cooperating latch and detent means on said trailer and casters, respectively, to lock said casters against swiveling movement;

(d) tongue means connected with said frame and including pivot means for securing the trailer to a vehicle;

(e) control bar means pivotally mounted on the trailer and supported in one position longitudinally adjacent said tongue means, said control means comprising telescoping sections which may be extended for connecting said control bar means to said vehicle;

(f) said control bar means including pivot means for securing to the vehicle at a point offset from the connection of said tongue to the vehicle when said control bar is pivoted away from said tongue means to a second position to form a rigid structure between the vehicle and trailer; and (g) actuating means mounted on said tongue and operatively connected to actuate said latch and detent means to release said casters for swiveling.

2. The invention of claim 1 including means to lock said sections in extended relationship.

3. The invention of claim 1 wherein said control bar means is pivotally mounted on the trailer to extend longitudinally along one side of said tongue means.

4. The invention of claim 3 wherein said actuating means includes a crank pivotally mounted on said tongue and wherein said crank extends toward the side of said tongue means along which said control bar means extends.

5. The invention of claim 4 wherein said actuating means further includes a cable means connected thereto and spring means connected to the other end of said cable means; a pair of cables connected to said spring means; a pair of pulleys carried by said frame; each of said cables extending around one of said pulleys and connected with said latch means so that when said crank is rotated, said cable means and spring means connected therewith pulls on each of said cables to release said latch means from said detent means on said casters.

6. The invention of claim 5 wherein said latch means is spring loaded to tend to move said latch means towards engagement with said detent means.

7. The invention of claim 6 wherein said actuating means is constructed and arranged so that it may be moved to a position which retains said latch means in released relationship relative to said detent means.

8. The invention of claim 3 wherein said control bar means comprises telescoping sections which may be extended for connecting said control bar means to said vehicle.

9. The invention of claim 8 including means to lock said sections in extended relationship.

10. The invention of claim 4 wherein said control bar means comprises telescoping sections which may be extended for connecting said control bar means to said vehicle.

11. The invention of claim 10 including means to lock said sections in extended relationship.

12. The invention of claim 1 wherein said actuating means is constructed and arranged so that release of said cooperating latch and detent means is blocked by said control bar means when supported in said one position adjacent said tongue means.

13. The invention of claim 1 wherein said actuating means is constructed and arranged so that release of said cooperating latch and detent means is blocked by said control bar means when supported in said one position adjacent said tongue means.

14. The invention of claim 2 wherein said actuating means is constructed and arranged so that release of said cooperating latch and detent means is blocked by said control bar means when supported in said one position adjacent said tongue means.

15. The invention of claim 3 wherein said actuating means is constructed and arranged so that release of said cooperating latch and detent means is blocked by said control bar means when supported in said one position adjacent said tongue means.

References Cited

UNITED STATES PATENTS

| | | | |
|---|---|---|---|
| 2,432,357 | 12/1947 | Vars | 280—474 |
| 2,475,174 | 7/1949 | Boone | 280—456 R |
| 2,537,521 | 1/1951 | Forbes | 280—116 |
| 2,949,317 | 8/1960 | Zaha | 280—456 R |
| 3,033,593 | 5/1962 | Zaha | 280—460 R |
| 3,098,257 | 7/1963 | Zaha | 280—456 R |
| 3,322,440 | 5/1967 | Breithaupt | 280—474 X |

FOREIGN PATENTS

| | | | |
|---|---|---|---|
| 596,722 | 4/1960 | Canada | 280—456 R |
| 619,880 | 5/1961 | Italy | 280—474 |

LEO FRIAGLIA, Primary Examiner